United States Patent Office 3,150,144
Patented Sept. 22, 1964

3,150,144
PIPERIDYL AND CYCLOALKYL DERIVATIVES
OF 1,1- AND 1,2-DIARYLETHANOLS
Frank P. Palopoli and Harvey D. Benson, Cincinnati,
Ohio, Robert E. Allen, Walnut Creek, Calif., and Edward L. Schumann, Kalamazoo, Mich., assignors to
Richardson-Merrell Inc., New York, N.Y., a corporation of Delaware
No Drawing. Filed Oct. 17, 1961, Ser. No. 145,761
5 Claims. (Cl. 260—294.7)

This invention relates to new chemical compounds which have useful physiological and other valuable properties.

The new compounds of the present invention are heterocyclic and cycloalkyl derivatives of 1,1- or 1,2-diarylethanols. They may be represented by the following formula

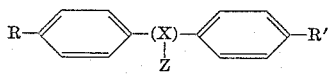

in which (X) is an ethanol

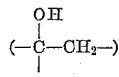

group, and in which one of the groups represented by R and R' is a basic ether group of the formula $$-OC_nH_{2n}A$$

in which A is a dialkylamino or a monocyclic nitrogen-containing heterocyclic group. The dialkylamino groups contain alkyl groups of from one to four carbon atoms, while the monocyclic heterocyclic group includes morpholino and piperidino groups; $n$ is an integer from two to four. The remaining R or R' group may be hydrogen, lower alkyl, halogen, or lower alkoxy. Z is a heterocyclic group such as piperidyl, N-methylpiperidyl, or a cycloalkyl group such as cyclohexyl. This invention also includes the N-oxides and the quaternary ammonium salts of the compounds of the above general formula.

The new and novel ethanols have the formulas:

TYPE I

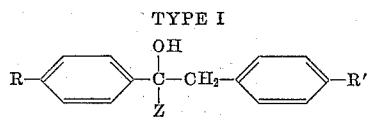

TYPE II

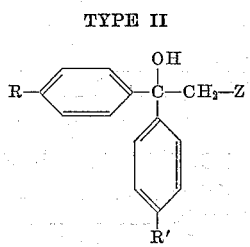

wherein R, R' and Z have the meanings described above.

The ethanols of Type I may be prepared by reaction of a substituted benzyl magnesium bromide or chloride with a heterocyclic or cycloalkyl phenyl ketone substituted with the —OC$_n$H$_{2n}$A group on the phenyl radical. The ketone is obtained by reacting an alkali metal salt of a heterocyclic or cycloalkyl hydroxyphenyl ketone with a dialkylaminoalkyl halide, such as diethylaminoethyl chloride.

The following scheme illustrates the preparation of compounds of Type I:

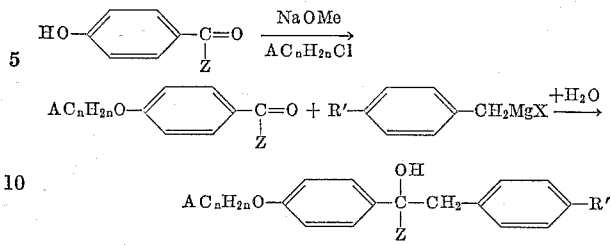

The ethanols of Type I may also be synthesized by first preparing the corresponding ethanol containing a phenolic OH group. The alkali metal salt of the phenolic substituted ethanol may be then converted to compounds of Type I by reaction with a dialkylaminoalkyl halide, as illustrated by the following scheme:

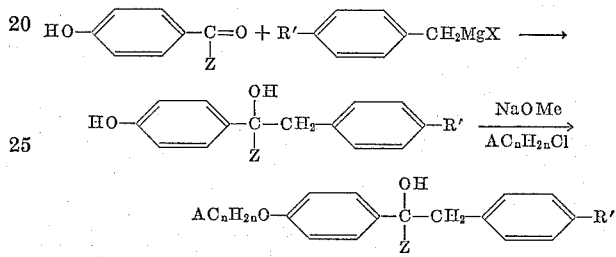

The ethanols of Type II may be prepared by the reaction of a lithium reagent of an appropriately substituted heterocycle or cycloalkane with a benzophenone substituted with the —OC$_n$H$_{2n}$A group as illustrated by the following:

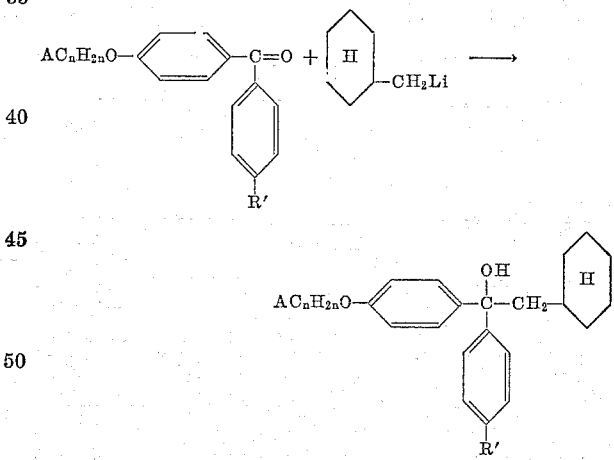

The N-oxides of the ethanol derivatives are prepared by oxidation of these derivatives with hydrogen peroxide.

The new compounds are basic and may be used as either the free bases or as acid addition salts or quaternary ammonium salts of these bases. These acid addition salts include the hydrochloride, hydrobromide, citrate, succinate, phosphate, sulfate, glycolate, acetate, malonate, maleate and other pharmaceutically suitable salts.

The compounds of the present invention are characterized by having valuable physiological properties, the most useful of which is their anti-inflammatory activity which makes them useful in reducing inflammation and edema as in the treatment of reumatoid arthritis and other collagen diseases, gouty arthritis, neuralgia, bursitis, conjunctivitis and the like. Some of the new compounds have anti-fungal activity and are of value in the treatment of epidermal fungal infections. Some of the new compounds also have uterotrophic activity and are useful in functional uterine disorders. Many of the new compounds of the present invention are also active in depressing the cholesterol levels in tissues and serum, and others have an adrenal regulatory activity which makes them of value in controlling blood pressure. The principal specific physiological activity of these compounds is indicated in the specific examples which follow.

The new compounds may be administered orally in tablet or other suitable form, parenterally, e.g. intravenously, or topically in an ointment. The dosage range will vary depending upon the mode of administration and intended use varying from 25 milligrams to 2.5 grams daily when given orally, 0.1 milligram to 1.5 grams daily when given parenterally and in concentrations of 1 to 10 percent when used in ointments.

EXAMPLE I

1-[p-(β-Diethylaminoethoxy)Phenyl]-1-Cyclohexyl-2-p-Anisylethanol

Sixty-five grams of p-(β-diethylaminoethoxy)-phenyl cyclohexyl ketone in 300 ml. of ether was added in one hour to a 0.45 N solution of p-methoxybenzylmagnesium chloride in 1000 ml. of ether. After stirring an additional hour the insoluble magnesium complex was isolated and decomposed with a saturated ammonium chloride solution. The oil which separated was taken up in ether from which 1-[p-β-diethylamino-ethoxy)phenyl]-1-cyclohexyl-2-p-anisylethanol was obtained as an oil whose dihydrogen citrate salt melted with decomposition at 90° C.

The intermediate ketone was prepared as follows: a mixture of 50 g. of p-hydroxyphenyl cyclohexyl ketone and 14.5 g. of sodium methylate in 300 ml. of anhydrous benzene was refluxed for one hour. A solution of 36.5 g. of β-diethyl-aminoethyl chloride in 100 ml. of dry benzene was added and the mixture refluxed an additional four hours. The benzene was extracted twice with a five percent sodium hydroxide solution, dried over anhydrous potassium carbonate, the solvent removed, and the residue distilled. The product, p-(β-diethyl-aminoethoxy)phenyl cyclohexyl ketone was obtained as an oil, boiling at 190° C. at 0.7 mm. and formed a hydrochloride salt, melting at 129–130° C.

This compound possesses anti-fungal and anti-inflammatory activities and depresses the cholesterol level in serum and tissues.

EXAMPLE II

1-[p-(β-Diethylaminoethoxy)Phenyl]-1-(2-Piperidyl)-2-p-Anisylethanol

A solution of 13.5 g. of 1-[p-(β-diethylamino-ethoxy)-phenyl]-1-(2-pyridyl)-2-p-anisylethanol in 150 ml. of a fifty percent methanol-water mixture containing 3.72 g. of 98 percent acetic acid was hydrogenated using 0.5 g. of platinum oxide as catalyst and sixty pounds hydrogen pressure. After the theoretical amount of hydrogen was adsorbed, the catalyst was removed by filtration, the solvent evaporated and the acid salt neutralized. The desired product, 1-[p-(β-diethylaminoethoxy)phenyl]-1-(2-piperidyl)-2-p-anisyl-ethanol, was obtained as an oil which formed a dimaleate salt melting with decomposition at 96° C.

This compound possesses anti-inflammatory activity.

EXAMPLE III

1-[p-(β-Diethylaminoethoxy)Phenyl]-1-(4-Piperidyl)-2-Phenylethanol

1-[p-(β-diethylaminoethoxy)phenyl]-1-(4-pyridyl) - 2-phenylethanol dihydrochloride was hydrogenated at sixty pounds of hydrogen and room temperature using platinum oxide catalyst. The product 1-[p-(β-diethylaminoethoxy)-phenyl]-1-(4-piperidyl)-2-phenylethanol formed a dihydrochloride salt melting at 216–218° C.

EXAMPLE IV

1-[p-(β-Diethylaminoethoxy)Phenyl]-1-Phenyl-2-(4-Piperidyl)Ethanol

Forty-five grams of p-(β-diethylaminoethoxy)benzophenone dissolved in 100 ml. of dry ether was added during one hour to 0.2 moles of γ-picolyl lithium in 500 ml. of ether. The reaction mixture was refluxed for one hour and then the lithium complex was decomposed with a saturated solution of ammonium chloride. The ether layer was washed and dried, the solvent was removed under reduced pressure, and the residue was crystallized from petroleum ether (B.P. 40–60° C.) yielding 1-[p-(β-diethylaminoethoxy)phenyl] - 1-phenyl-2-(4-pyridyl)ethanol, melting point 108–109° C.

Twenty-five grams of the hydrochloride salt of 1-[p-(β-diethylaminoethoxy)phenyl] - 1-phenyl-2-(4-pyridyl)-ethanol in methanol solution was hydrogenated at sixty pounds hydrogen pressure using platinum oxide as the catalyst. The catalyst was removed, the solvent was removed from the filtrate under reduced pressure and the gummy residue was chilled and treated with ether and dilute aqueous sodium hydroxide solution. The ether solution was washed, dried and the ether was removed under reduced pressure, leaving the desired product, 1-[p-(β - diethylaminoethoxy)phenyl] - 1 - phenyl-2-(4-piperidyl)-ethanol as a light yellow, clear viscous oil.

This case is a continuation-in-part of U.S. application Serial No. 843,630 filed October 1, 1959, now abandoned.

We claim:

1. A compound of the formula:

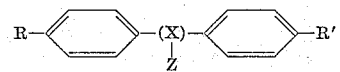

in which (X) is a radical of the ethanol group; one of the groups represented by R and R' is a basic ether group of the formula —$OC_nH_{2n}A$ in which A is dialkylamino in which the alkyl groups contain from 1 to 4 carbon atoms; $n$ is an integer from 2 to 4 inclusive; the remaining R or R' is selected from the group consisting of hydrogen and lower alkoxy; and Z is selected from the group consisting of piperidyl, N-methylpiperidyl and cyclohexyl.

2. 1 - [p-(β-diethylaminoethoxy)phenyl]-1-cyclohexyl-2-p-anisylethanol.

3. 1 - [p - (β - diethylaminoethoxy)phenyl]-1-(2-piperidyl)-2-p-anisylethanol.

4. 1 - [p - (β - diethylaminoethoxy)phenyl]-1-(4-piperidyl)-2-phenylethanol.

5. 1 - [p - (β-diethylaminoethoxy)phenyl]-1-phenyl-2-(4-piperidyl)ethanol.

References Cited in the file of this patent

UNITED STATES PATENTS

| 2,566,360 | Papa | Sept. 4, 1951 |
| 2,703,324 | Binkley | Mar. 1, 1955 |
| 2,914,529 | Allen | Nov. 24, 1959 |

FOREIGN PATENTS

| 507,597 | Belgium | Dec. 31, 1951 |
| 570,569 | Canada | Feb. 10, 1959 |
| 587,752 | Canada | Nov. 24, 1959 |

OTHER REFERENCES

Wertheim: Textbook of Organic Chemistry 2nd ed. pp. 763–67 Phil. Blakiston, 1945.